United States Patent [19]

Gaspard et al.

[11] Patent Number: 4,809,510

[45] Date of Patent: * Mar. 7, 1989

[54] FLOWLINE POWER GENERATOR

[75] Inventors: Preston T. Gaspard, Marrero; Lewis D. Holmes, Jr., Harvey, both of La.; James V. Theis, Boynton Beach, Fla.

[73] Assignee: Baker CAC, Inc., Belle Chasse, La.

[*] Notice: The portion of the term of this patent subsequent to Mar. 31, 2004 has been disclaimed.

[21] Appl. No.: 18,596

[22] Filed: Feb. 25, 1987

Related U.S. Application Data

[63] Continuation-in-part of Ser. No. 694,508, Jan. 24, 1985, Pat. No. 4,654,537.

[51] Int. Cl.[4] .................. F01B 25/00; F01K 25/14
[52] U.S. Cl. ...................... 60/648; 415/144; 416/DIG. 4; 290/52
[58] Field of Search ............. 290/43, 52, 54; 415/144, 145; 416/DIG. 4; 60/648

[56] References Cited

U.S. PATENT DOCUMENTS 3,992,891 11/1976 Pocrnja .................. 60/648 X

Primary Examiner—Allen M. Ostrager
Attorney, Agent, or Firm—Hubbard, Thurman, Turner & Tucker

[57] ABSTRACT

A flowline power generator especially adapted for use on a conduit or flowline carrying petroleum or hydrocarbon products is disclosed. A valve body incorporated in the flowline redirects at least a portion of the fluid flowing through the flowline into engagement with a turbine which drives an electrical generator. A gate valve is provided for bypassing the turbine to permit all of the flow in the conduit to bypass the power generator, and yet provide substantially the same pressure drop to protect downstream equipment from high-pressure surges. In the bypass configuration, the power generator can be repaired or completely removed. The valve body can be incorporated into the flowline with no power generator attached, and power generators can be subsequently installed at prescribed locations along the conduit.

6 Claims, 3 Drawing Sheets

FLOWLINE POWER GENERATOR

This application is a continuation-in-part of Ser. No. 694,508, filed Jan. 24, 1985, now U.S. Pat. No. 4,654,537.

BACKGROUND OF THE INVENTION

1. Field of the Invention

This invention relates to the generation of mechanical or electrical power from the fluid dynamic energy of a fluid transported through a flowline or a pipeline and, more particularly, relates to the selective generation of electrical power at remote locations on a flowline or pipeline used to transport fluids without substantially changing the downstream fluid pressure in the flowline.

2. Description of the Prior Art

Electrical power is acquired for many operations performed in conjunction with the production, gathering, and distribution of fluids and various flow media in the petroleum industry. For example, multi-well gathering facilities require electrical power for heater/treater control panel, separator control panels, tank and flowline heaters, fire protection asistance, gas detector systems, electrohydraulic pumps, chemical injection pumps, telemetry equipment, and microprocessor-based control systems. Electrical power is also necessary on remote wells such as carbon dioxide producing and injection wells, gas injection wells, and water flood sites. Electrical power is necessary for actuating adjustable flowline chokes, power and flowline heaters, safety systems, and microprocessor-based telemetry equipment. Electrical power is necessary on pipelines, near pipeline valves for power in control systems for valve operators, line break systems, electrohydraulic power packs, and telemetry equipment. In offshore applications, electrical power is necessary for navigation systems such as fog horns, navigation lights, and communication systems. In short, there are a number of remote locations where continuous electrical power or intermittent electrical power is required for performing operations in the petroleum industry. In many of these locations it is uneconomical to employ engine-driven generators. Solar array panels have been employed to provide electrical power in remote locations. In offshore applications, marine cable has been laid to provide electrical power at remote locations.

Various prior devices have been used in an attempt to generate electrical power from the fluid dynamic energy of a working fluid flowing through a line or pipeline in the petroleum industry. These systems have commonly employed impellers or turbine rotors mounted in the flowline with the axis extending either parallel to or coincident with the axis of the flowline, to generate sufficient shaft horsepower to drive a conventional electrical generator. For example, shaft-driven brush commutated DC permanent magnet generators driven by coaxial mud turbines have been employed downhole in a pipe string to power well logging and other equipment.

In addition to conventional axial flow turbines, shaft horsepower has also been developed in other applications by use of impulse turbines powered by fluids engaging the turbines at their periphery. Impulse turbines driven by a series of nozzles located on the periphery of a chamber containing the turbine are disclosed in U.S. Pat. Nos. 4,060,336 and 4,150,918.

No prior art method or apparatus using a turbine-driven generator to convert the fluid dynamic energy of a working fluid in a flowline into electrical power is known in which the turbine-driven generator may be attached or removed while the fluid is flowing through the line and without substantially changing the downstream fluid pressure as a consequence of such attachment or removal. Furthermore, no prior device provides for a selective fluid bypass capable of bypassing fluids around the turbine when electrical power is not required, and also permitting selective actuation of the turbine as desired without substantially affecting the downstream fluid pressure.

SUMMARY OF THE INVENTION

A method and apparatus for use in converting the fluid dynamic energy of a fluid flowing in a conduit, flowline, or pipeline to electrical energy available at prescribed locations intermediate the ends of the conduit comprises a fluid pressure engine, such as a turbine, driven by the fluid flowing in the conduit, connected to an electrical generator. A separate member such as a valve body is incorporable in the flowline at each prescribed location and the turbine and generator can be attached to the valve body. The valve body comprises a diverter tube apparatus for redirecting at least a portion of the flow in the conduit along a path transverse to the conduit. The redirected fluid is brought into engagement with the rotary turbine to generate shaft horsepower from the pressure drop of the working fluid through a nozzle located adjacent to the periphery of the turbine. In the preferred embodiment, the turbine rotates about an axis transverse or perpendicular to the axis of the fluid conduit or flowline. A bypass passage communicating with the valve body and shiftable between first and second positions, provides the means for diverting fluid from engagement with the turbine. This bypass passage can be shifted into a position communicating between both the upstream and downstream sections of the conduit. With the bypass passage communicating between the upstream and downstream conduit sections, the turbine and the generator can be removed from the valve body without interferring with the flow through the conduit or pipeline. Use of a valve body having this internal bypass section also permits attachment of a turbine generator at any location in which the valve body is incorporated into the conduit at any time during operation of the pipeline. The bypass section or gate is manipulated externally so that the bypass section or gate can remain closed until it becomes necessary to actuate the turbine power generator.

In accordance with the method of this invention, the bypass passage is proportioned to produce substantially the same pressure drop as the turbine which it replaces. Thus, the turbine can be connected to or removed from the conduit without subjecting downstream apparatus to dangerous pressure surges.

DETAILED DESCRIPTION OF THE PREFERRED EMBODIMENT

Figure 1:
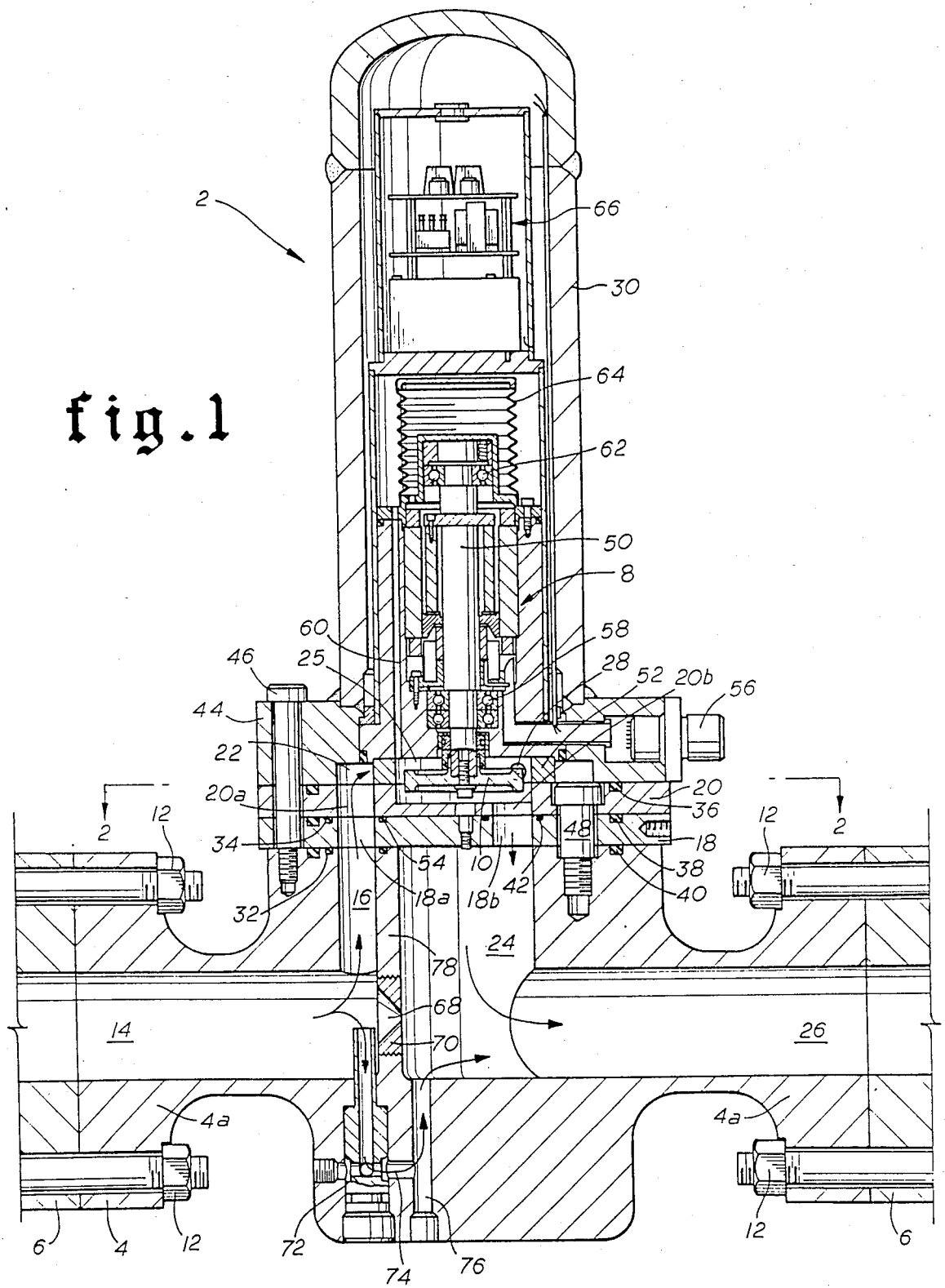
FIG. 1 is a sectional view of the flowline turbine power generator and valve body assembly incorporated at a prescribed location within the flowline.

The turbine-driven, in-line electrical power generator 2 comprising the preferred embodiment of this invention includes a valve body 4 incorporable in a flowline or pipeline 6, and an electrical generator assembly 8, a fluid pressure engine, such as turbine 10, and a valve gate assembly 18 and 20, including a bypass passage 18c. The turbine 10 and the generator assembly 8 can be mounted on the valve body 4. In the preferred embodiment of this invention, the flowline 6 comprises a conventional flowline or pipeline used for the transportation of petroleum fluids such as crude oil. For example, the line 6 can comprise a cross-country pipeline or it can comprise a line in a gathering system located in an oil field having a number of producing wells. Normally, although not necessarily, the line 6 will comprise a surface line where access for attachment, removal, or servicing of the power generating unit is available. The valve body 4 has flanged sections 4a at either end and means for receiving a plurality of studs 12 for attaching and incorporating the valve body 4 into the flowline. The valve body 4 is incorporated into the flowline at a time when no fluids are flowing in that portion of the flowline. Thus, valve bodies 4 can be inserted into a new pipeline at prescribed or predetermined locations at which electrical power may subsequently become necessary. The valve body 4 can be inserted into the flowline 6 independently of the generator 8 and turbine 10. Therefore, the generator 8 and turbine 10 need only be attached to the valve body 4 subsequent to the initial installation of the valve body 4 at the time when electrical power becomes necessary.

Valve body 4 has a first or upstream flow passageway 14 aligned with the flow passageway through the upstream section of the pipeline or conduit section 6. In the preferred embodiment the inner diameter of upstream passageway 14 is equivalent to the inner diameter of the upstream conduit section. A similar downstream passageway 26 in valve body 4 also communicates with the downstream bore of flowline 6. In the preferred embodiment the second or downstream flow passageway 26 is coaxial to the upstream or first passageway 14. Intermediate the ends of the valve body 4, a transversly extending wall or partition 78 separates the first or upstream passageway 14 from the second or downstream passageway 26. In the embodiment depicted in FIG. 1, a plug 70 containing an orifice 68 is insertible in partition 78. Orifice 68 provides direct communication between upstream flow passageway 14 and downstream flow passageway 26. The plug 70 is removable and can be replaced by a solid plug preventing direct communication between flow passageway 14 and flow passageway 26. As will be subsequently described, the provision for a plug, such as plug 70 containing orifice 68, is related to the relative flow rates in the conduit 6 and the desired flow rates through the turbine 10.

The intermediate partition 78 defines a transversely extending, third flow passageway 16, which communicates directly with the upstream passageway 14. In the preferred embodiment of this invention, the transverse passageway 16 extends perpendicular to the axis of the upstream flow passage 14 and the axis of the tubular conduit 6. Flow passageway 16 opens on the exterior of the main valve body 4 and is shown in FIG. 1 positioned in alignment with a flow passage 18a located in a shiftable disk gate 18 securable to the top of the valve body 4. A fourth flow passageway 24 also extending transversly to the axis of the conduit 6 is positioned on the opposite side of partition 78 from the third flow passageway 16. In the preferred embodiment of this invention, flow passage 24 has a diameter equal to or greater than the diameter of the downstream flow passageway 26 with which the flow passage 24 communicates. Flow passage 24 opens on the planar upper surface 4c of valve body 4 which surface abuts the shiftable disk gate 18. A back-pressure valve 72 is located on the lower portion of valve body 4 and communicates at one end with the upstream flow passageway 14. The back-pressure or check valve 72 can comprise a conventional back-check valve having a plunger or ball spring-loaded to engage a valve seat located therein. The spring-loaded ball or plunger (not shown) would be maintained in engagement with the valve seat to prevent flow of fluids from the downstream side of the valve 72 into the upstream flow passage 14. When the pressure in upstream flow passage 14 is sufficient to overcome the spring load on the ball, the ball is forced off of its seat to permit flow from the upstream flow passage 14 into the back-pressure valve 72. When the pressure differential between the first and second passageways acting on the back-pressure valve 72 reaches the prescribed level, the valve opens and the RPM and torque of the turbine is thus maintained within prescribed limits. An axially extending channel 74, communicating with the downstream side of the back-pressure valve 14, joins a transversely extending flow passage 76. Transversely passageway 76 in turn communicats with the downstream flow passages 24 and 26. Flow passage 74 is drilled in the side of the valve body 4 and intersects flow passage 76 which is drilled from the lower surface of the valve member 4. Flow passages 72 and 76 receive conventional plug members to seal the flow passages.

A gate valve comprises two planar metal disk sections 18 and 20. Lower gate valve section or disk 18 is positioned in contact with the upper surface 4c of valve body 4. A first vertical aperture 18a in disk 18 is alignable with valve body flow passage 16 in the position shown in FIG. 1. An O-ring seal 32 mounted in a groove in valve body 4 completely encircles fluid passageway 16 establishing sealing integrity at this juncture between the valve body and the gate disk 18. A larger O-ring seal 40 extends around and adjacent the periphery of disk 18 to further establish sealing integrity between the valve body 4 and the gate valve disk 18. A second vertical hole 18b extends through the gate valve disk 18 and is positioned in communication with flow passageway 24 in the valve body 4 in the configuration shown in FIG. 1. Gate valve disk 18 also includes openings for receiving pins 46 and 48, which are respectively engaged with threaded holes in the planar upper surface of the valve body 4.

A second gate valve disk 20 is positioned in overlapping contact with gate valve disk 18. Planar gate valve disk 20 also has openings for respectively receiving pin 46 and pin 48. Pin 48, however, has a head which engages a shoulder on the upper side of the hole extending through disk 20. O-ring 42 is mounted in the upper surface of valve disk 18 to establish sealing integrity with opening 18b in the configuration shown in FIG. 1.

An opening 20a on the opposite side of disk 20 is positioned in alignment with opening 18a in the configuration shown in FIG. 1. O-ring seal 34 establishes sealing integrity at the juncture between openings 18a and 20a.

Figure 2:
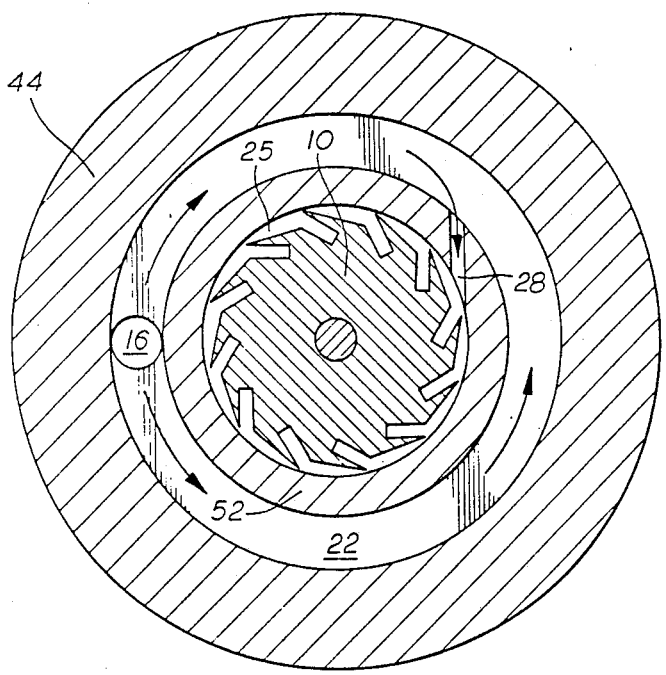
FIG. 2 is a sectional view taken along sections 2—2 of FIG. 1.

The generator assembly includes outer housing 30 and a flange 44 welded or otherwise rigidly secured to the base of generator housing 30. Housing 30 is positioned with flange 44 in overlapping relationship to gate valve disk 20. Flange 44 has a hole for receiving bolt 46. It should be understood that additional bolts 46 can be provided for rigidly securing the generator assembly to the valve disk 20. O-ring seal 36 is positioned adjacent to the periphery of disk 20 to establish sealing integrity between disc 20 and flange 44. An annular opening 22 is defined on the lower surface of flange 44. As best seen in FIG. 2, annular opening 22 is in communication with the flow passageway comprising sections 16, 18a, and 20a. An annular partition 52, positioned in engagement with the upper surface of disc 20 at the lower end of flange 44, separates the annular cavity 22 from an interior cavity 25. A nozzle 28 (FIG. 2) extends through annular partition 52 to establish communication between the outer cavity 22 and the inner cavity 25. The inner cavity 25 defined by partition 52 and by a recess in the upper surface of valve disk 20 is cylindrical and is adapted to receive a turbine rotor 10 positioned therein with its axis of rotation oriented perpendicular to flow passages 14 and 26 in the valve body 4.

Turbine rotor 10 is described in more detail in U.S. Pat. No. 4,150,918, incorporated herein by reference. The outer portion of turbine rotor 10 contains buckets 10a in alignment with nozzle 28 as described in more detail in said U.S. Pat. No. 4,150,918 for translating the kinetic energy of the fluid passing from nozzle 28 and into reacting engagement with the turbine rotor 10 into rotary mechanical energy developing sufficient shaft horsepower to drive the generator 8. The pressure drop through nozzle 28 from the relatively high-pressure region in flow passages 14, 16, 18a and 20a, and in the outer annular cavity 22 to the relatively lower pressure or downstream side in inner cavity 25 flow passages 20b, 18b, 24, and 26 provides the energy to drive the turbine. The turbine shaft 50 extending perpendicular to the flow passages 14 and 26 and to the flow passage of conduit 6, extends upwardly into a conventional generator assembly 8. Rotation of turbine 10 and shaft 50 thus provides the rotary mechanical energy to drive a conventional generator for producing AC or DC electrical current. Bearings 58 are located around the periphery of shaft 50 in a conventional manner.

The generator assembly 8 includes an upper bellows 64 surrounding upper bearings 62 located at the upper end of turbine shaft 50. Means are provided for equalizing the force on opposite sides of bearings 62 and bearings 58. A fluid is poured into the generator housing and air allowed to escape from the interior of bellows 62. A separate flowline 60 extends upwardly in the outer generator housing 30 on the exterior of the bellows 64. Flowline 60 communicates with the inner cavity 25 in which turbine 10 and in which relatively lower pressure working fluids are present. Working fluids are thus disposed on the exterior of the bellows acting against the pressure the fluid deposited on the interior thereof. The bellows acts to insure that the pressure of the fluid within the interior of the generator assembly is equal to the pressure in inner cavity 25 acting on the area of the lower end of the shaft adjacent to bearings 58. Thus, the fluid pressure acting on the sealed shaft ends is at all times balanced. Conventional electrical components 66 for controlling the power output by the conventional generator assembly 8 are located at the upper portion of the generator assembly within the outer generator assembly housing 30. Electronic control wires and power lines will be brought out through a high-pressure electrical connection 56.

Figure 3:
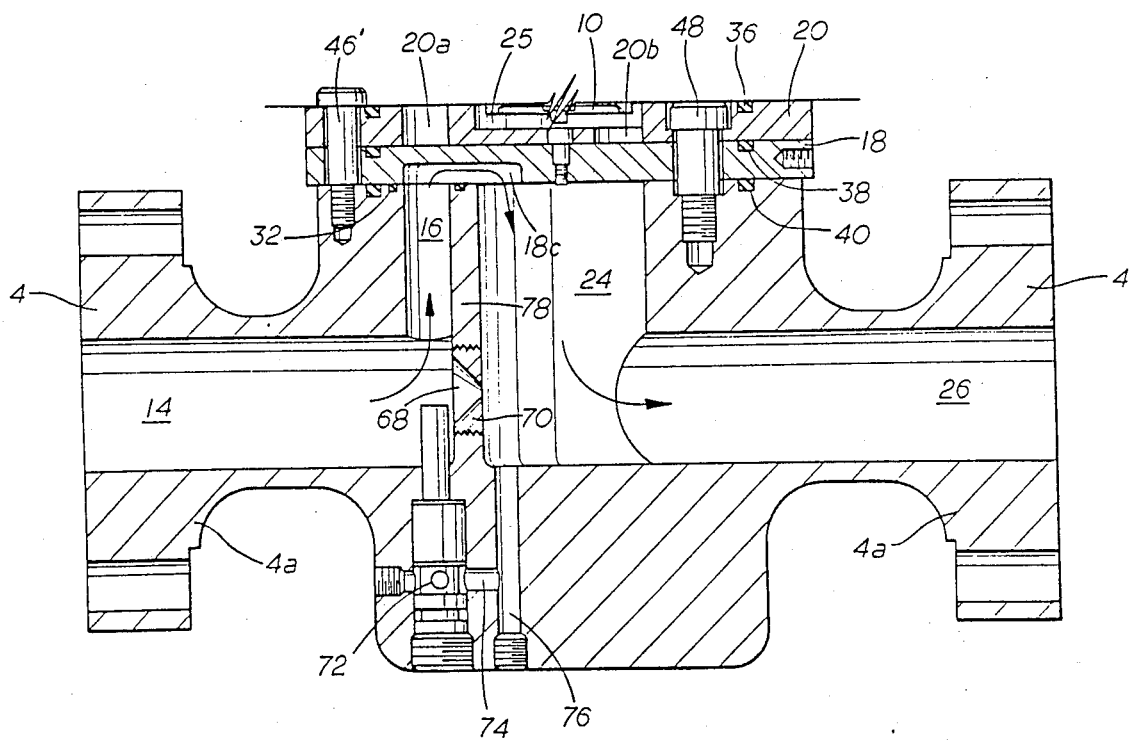
FIG. 3 is a vertical sectional view of the valve body with the bypass gate in the closed position and the turbine and electrical generator removed from the valve body.

FIG. 3 illustrates the configuration of valve body 4 and of gate valve disks 18 and 20 when the generator assembly 8 is removed from valve body 4 by unscrewing bolts 46. Note that valve disk 18 has been rotated to align a laterally extending flow passage 18c in the bottom face of disk 18 with both flow passages 16 and 24; thus, providing direct communication from flow passage 14 through passage 16 through flow passage 18c through flow passage 24 into flow passage 26. A restriction is preferably provided in passage 18c to simulate the pressure drop resulting from the passage of fluid through the nozzle 28 and turbine rotor 10 to prevent sudden pressure increases downstream when valve plate 18 is closed. Alternatively, the flow area of passage 18c is proportioned to yield the desired pressure drop. The valve disk 18 is shifted from the position shown in FIG. 1 to the position shown in FIG. 3 by engaging the periphery of the gate valve disk 18 by conventional means and rotating the valve disk. Rotation of the valve disk 18 is stopped by pin 48, which cooperates with an arcuate slot 18e in valve disk 18, when passages 18a and 18c are out alignment with passages 16 and 24 and when bypass portion 18c defined on the lower side of gate valve disk 18 is in the position shown in FIG. 3.

When the turbine and generator assembly as shown in FIG. 1 is to be removed, the first step is to rotate the gate valve disk 18 from its position shown in FIG. 1 to its position shown in FIG. 3. Flow continues in conduit 6 through passages 14 and 26 in valve body 4, but in the configuration shown in FIG. 3, fluid bypasses the turbine 10. The turbine 10 and generator assembly 8 can thus be easily removed by disengaging bolts 46 from valve body 4 while fluid continues to flow through the conduit with substantially the same pressure drop as when the turbine 8 was connected. If desired, shorter bolts 46' may be substituted for bolts 46. The generator assembly 8 and turbine 10 attached thereto can also be assembled to a valve body 4 located in flowline 6 when it becomes necessary to tap the kinetic energy of the working fluid to generate electrical power at a prescribed location along the flowline. Once the generator assembly 8 and turbine 10 are assembled, the gate valve disk 18 is rotated from the position shown in FIG. 3 to the position shown in FIG. 1 to introduce fluid into the inner cavity 25 such that the pressure drop through nozzle 28 actuates the turbine 10. Again the downstream pressure remains substantially the same.

Depending upon the flow rates through the conduit 6 and the optimum flow rates required through nozzle 28 for actuating turbine 10, it may be necessary to provide a continuously open alternate passageway which allows fluid to continuously bypass the turbine 10. Plug 70 containing orifice 68 is securable in partition 78 for the purposes of providing a continuous vent from the high-pressure upstream flow passage 14 to the low-pressure downstream passage 26. Note that the pressure drop through the orifice or vent 68 is substantially equal to the pressure drop through orifice 28 and across to turbine 10. Thus a portion of the fluid in the conduit 6 may be used as a working fluid to drive the turbine 10 to produce electrical power while the remaining portion of the fluid may be vented through orifice 68. If for some reason the pressure of fluid in the flowline is greater than anticipated or fluctuates, the back-pressure valve 72 communicating through passages 74 and 76 provides a separate fluid bypass. When the pressure in flow passage 14 exceeds the pressure in flow passage 26 by an amount sufficient to urge the check valve 72 off its seat and against the action of a spring (not shown), fluid can flow through the conventional check valve directly between passages 14 and 26. It should be noted that the check valve 26 can be changed as desired, and the plug 70 can be sized to provide the desired orifice opening 68. Furthermore, a solid plug can be incorporated in wall 68 and the device operated with no continuously open vent or bypass.

The automatic maintenance of a substantially constant fluid pressure drop between the upstream conduit 14 and the downstream conduit 16 of the valve body 4 regardless of whether turbine 10 is attached and operating, is of extreme importance when handling upstream fluid pressures on the order of thousands of pounds per square inch. The method of this invention insures that no surges of high pressure will be transmitted to downstream equipment normally designed for lower pressure operation.

Figure 4:
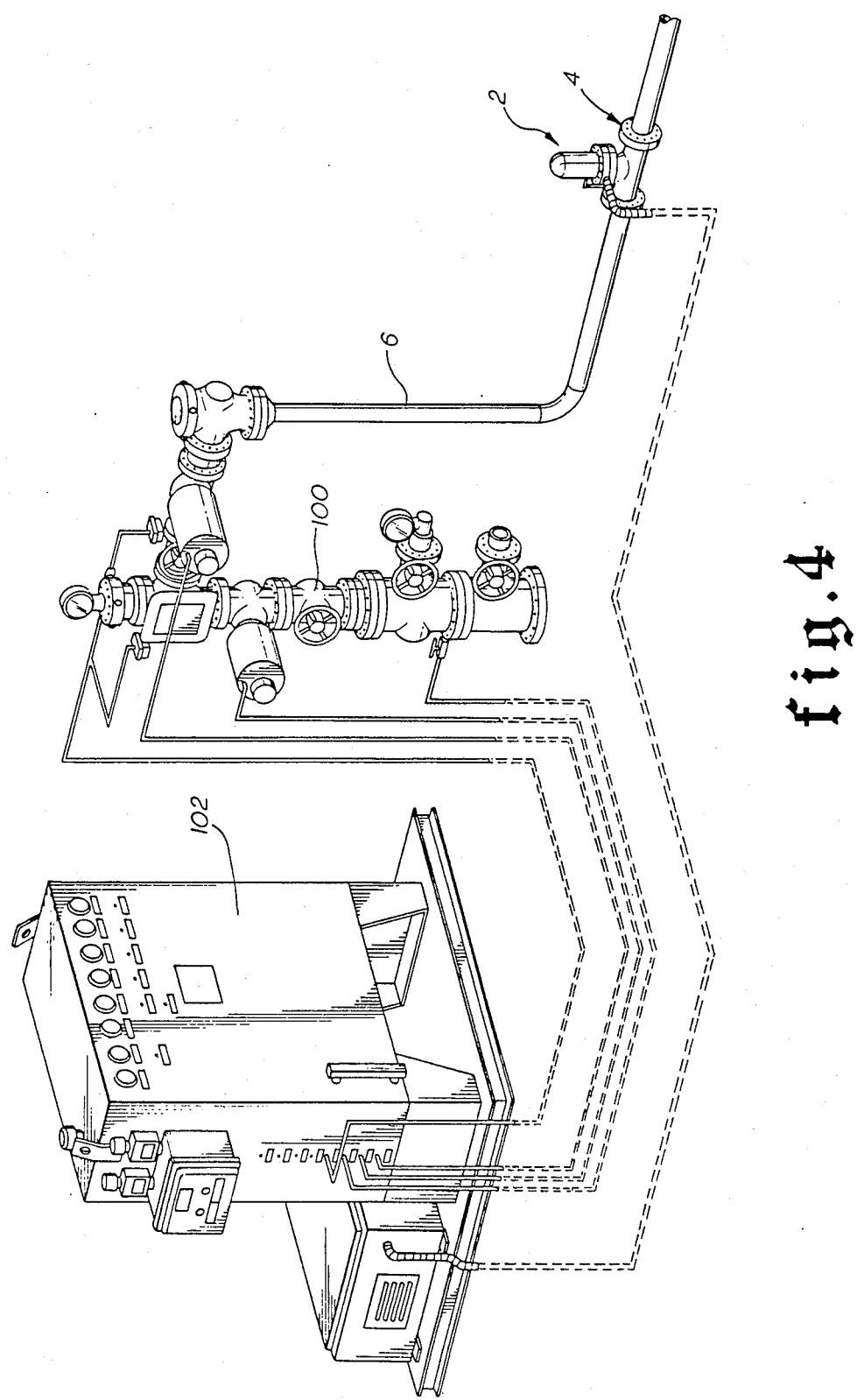
FIG. 4 shows a typical installation using the turbine power flow generator in a flowline adjacent a wellhead, when used to power a microprocessor-based electrohydraulic single well control package.

FIG. 4 discloses an illustration of a typical situation in which the flowline power generator is used. Note that power generator 2 is positioned on flowline 6 with valve body 4 incorporating intermediate the ends of the flowline. Flowline 6 extends directly from a wellhead 100. Electrical power generated by flowline power generator 2 can then be used to power a microprocessor-based electrohydraulic single well control package 102. It should, of course, be understood that the example depicted in FIG. 4 is only one application of the flowline power generator disclosed herein. Other applications in flowlines extending directly from a single well in well gathering systems, or in pipelines delivering fluids from point-to-point, will be apparent to those skilled in the art.

Although the invention has been described in terms of a specified embodiment which is set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent:

1. The method of selectively driving a fluid pressure engine by fluid pressure derived from a primary conduit comprising: the steps of inserting in said primary conduit a valve housing having noncommunicating inlet and outlet passages respectively communicating with parallel first and second flow passages terminating in a planar face of the valve housing; disposing the inlet and outlet passages of a fluid pressure engine in juxtaposed relation to said planar end face; rotatably and sealably mounting a valving disk intermediate said planar end face and said fluid pressure engine inlet and outlet to initiate fluid flow through the fluid pressure engine in a first angular position and to terminate fluid flow through the fluid pressure engine in a second angular position; providing a bypass fluid passage in said valving disk operative to interconnect said inlet and outlet passages in said second angular position; and proportioning said bypass fluid passage to produce substantially the same pressure drop as when fluid flows through said flow pressure engine, thereby protecting downstream apparatus from any pressure surge when fluid flow through said fluid pressure engine is terminated by shifting of said valving disk to said first position.

2. The method of claim 1 further comprising the step of providing an orifice-controlled flow of fluid between said first and second flow passages.

3. Apparatus for use in converting the fluid dynamic energy of fluid flowing in a conduit to mechanical energy, comprising: fluid pressure engine means for converting fluid dynamic energy into rotary mechanical energy; said engine means including a housing defining inlet and outlet fluid passages in an end face; a diverter tube forming a portion of the conduit, said diverter tube having noncommunicating first and second flow passageways at either end, each being aligned with the axis of the conduit, a third flow passageway communicating with the first passageway and extending transverse to the axis of the conduit to a planar external surface on said diverter tube, and a fourth flow passage way communicating with said second flow passageway and extending transverse to the axis of the conduit to said planar external surface on said diverter tube; means for removably mounting said engine housing on said planar external surface of said diverter tube with said third and fourth flow passageways being respectively alignable with said turbine inlet and outlet fluid passages; and a disk gate sealingly disposed intermediate said end, face of said turbine means and said planar external surface of said diverter tube, said disk gate being angularly shiftable about its axis between a first position establishing a direct fluid flow path between the third and fourth flow passageways, thereby isolating the turbine inlet and outlet fluid flow passages, and a second position in which said third flow passageway communicates with said turbine inlet fluid passage and said fourth flow passageway communicates with said turbine outlet fluid passage; said flow path being proportioned to produce a fluid pressure drop substantially equal to the fluid pressure drop across said fluid pressure engine, whereby mechanical power can be generated at any location along the conduit at which a diverter tube is located in the conduit and fluid can flow between sections of the conduit through the diverter tube during attachment or removal of said engine means relative to the conduit without producing any pressure surge downstream of said diverter tube.

4. The apparatus of claim 3 further comprising electrical generator means coaxially secured to said rotary fluid pressure engine means and driven thereby.

5. The apparatus of claim 3 further comprising a constricted orifice communicating between said first and second flow passageways to limit the pressure differential between said third and fourth flow passageways applied to said fluid pressure engine.

6. The apparatus of claim 5 further comprising a spring-biased check valve interconnecting said first and second flow passages and operative to limit the fluid pressure differential applied to fluid pressure engine.

* * * * *